United States Patent
Shibata

(10) Patent No.: US 9,922,275 B2
(45) Date of Patent: Mar. 20, 2018

(54) IMAGE FORMING APPARATUS COMPRISING A PUNCH MECHANISM FORMING A PUNCH HOLE IN A SHEET ON WHICH AN IMAGE IS FORMED BY AN IMAGE FORMING UNIT

(71) Applicant: KYOCERA Document Solutions Inc., Osaka-shi, Osaka (JP)

(72) Inventor: Yukihiro Shibata, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/243,992

(22) Filed: Aug. 23, 2016

(65) Prior Publication Data
US 2017/0061264 A1     Mar. 2, 2017

(30) Foreign Application Priority Data
Aug. 28, 2015  (JP) .................. 2015-169550

(51) Int. Cl.
*G06F 3/12* (2006.01)
*G06K 15/00* (2006.01)
*H04N 1/00* (2006.01)
*B65H 37/00* (2006.01)
*B26F 1/02* (2006.01)

(52) U.S. Cl.
CPC .............. *G06K 15/404* (2013.01); *B26F 1/02* (2013.01); *B65H 37/00* (2013.01); *H04N 1/0032* (2013.01); *H04N 1/00466* (2013.01); *H04N 1/00639* (2013.01); *B65H 2301/515* (2013.01); *H04N 2201/0094* (2013.01)

(58) Field of Classification Search
None
See application file for complete search history.

(56) References Cited

U.S. PATENT DOCUMENTS

| 6,295,908 B1* | 10/2001 | Holzhauser | B26F 1/04 83/334 |
| 7,528,990 B2* | 5/2009 | Lu | H04N 1/00403 358/1.9 |
| 7,536,128 B2* | 5/2009 | Haga | G06F 3/1208 399/82 |

(Continued)

FOREIGN PATENT DOCUMENTS

JP     2000094780 A     4/2000

*Primary Examiner* — Gabriel Garcia

(57) ABSTRACT

An image forming apparatus has an image forming unit, a punch mechanism, a display unit, a hole formation request receiving unit, a demand input receiving unit, a region designating unit, an extraction unit, a selection unit, and a punch mechanism control unit. The demand input receiving unit receives an input of a demand about punch hole formation from a user. The region designating unit designates a region in which a punch hole is to be formed by the punch mechanism through the display unit. The extraction unit extracts punch hole formation portion candidates having a printing rate lower than a predetermined value in the designated region. The selection unit causes a user to select the hole formation portion satisfying the demand. The punch mechanism control unit performs control so that the punch hole formation by the punch mechanism is carried out in the selected hole formation portion.

8 Claims, 7 Drawing Sheets

(56) References Cited

U.S. PATENT DOCUMENTS

| | | | |
|---|---|---|---|
| 7,578,498 B2 * | 8/2009 | Iguchi | B26D 5/32 270/58.07 |
| 2017/0061264 A1 * | 3/2017 | Shibata | G06K 15/404 |

* cited by examiner

IMAGE FORMING APPARATUS COMPRISING A PUNCH MECHANISM FORMING A PUNCH HOLE IN A SHEET ON WHICH AN IMAGE IS FORMED BY AN IMAGE FORMING UNIT

INCORPORATION BY REFERENCE

The disclosure of Japanese Patent Application No. 2015-169550 filed on Aug. 28, 2015 including the specification, drawings and abstract is incorporated herein by reference in its entirety.

BACKGROUND

The present disclosure relates to an image forming apparatus.

In an image forming apparatus typified by a multifunctional peripheral and the like, an image of a document is read by an image reading unit, and then a photoconductor provided in an image forming unit is irradiated with light based on the read image to form an electrostatic latent image on the photoconductor. Thereafter, a developing agent is supplied onto the formed electrostatic latent image to form a visible image, the visible image is transferred and fixed to a sheet, and then the sheet is discharged to the outside of the apparatus.

Some image forming apparatuses have, as part of post-processing, a staple mechanism of binding a plurality of sheets with end portions of the sheets aligned when the sheets are discharged to the outside of the apparatuses and a punch mechanism of forming a punch hole in an end region of a sheet. An image forming apparatus having the punch mechanism has already been disclosed.

SUMMARY

According to one aspect of the present disclosure, an image forming apparatus has an image forming unit, a punch mechanism, a display unit, a hole formation request receiving unit, a demand input receiving unit, a region designating unit, an extraction unit, a selection unit, and a punch mechanism control unit. The image forming unit forms an image on a sheet. The punch mechanism forms a punch hole in the sheet on which an image is formed by the image forming unit. The display unit displays data on an image to be formed by the image forming unit. The hole formation request receiving unit receives a request of punch hole formation in a sheet by the punch mechanism from a user. The demand input receiving unit receives an input of a demand about punch hole formation from a user. When the hole formation request receiving unit receives the punch hole formation request, the region designating unit designates a region in which a punch hole is to be formed by the punch mechanism through the display unit. The extraction unit extracts punch hole formation portion candidates having a printing rate lower than a predetermined value in the region designated by the region designating unit. The selection unit causes a user to select the hole formation portion satisfying the demand input by the demand input receiving unit from the punch hole formation portion candidates extracted by the extraction unit. The punch mechanism control unit performs control so that the punch hole formation by the punch mechanism is carried out in the hole formation portion selected by the selection unit.

DETAILED DESCRIPTION

Figure 1:
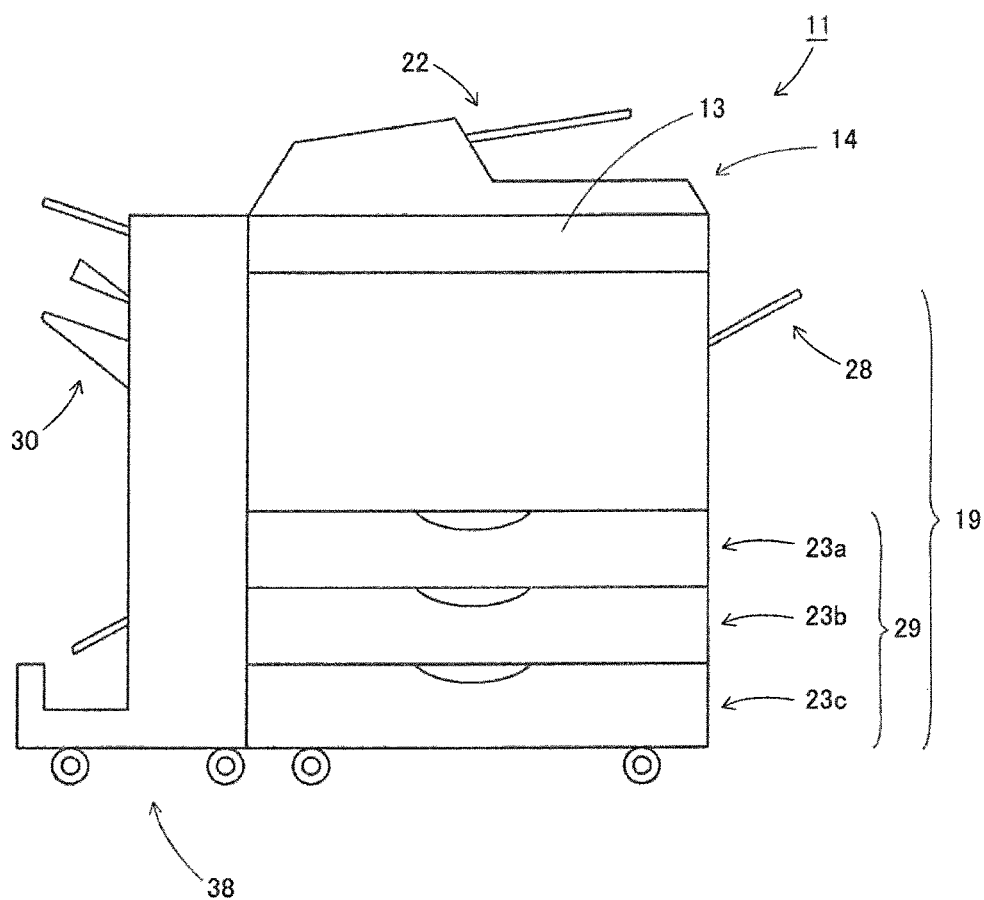
FIG. 1 is a view illustrating the appearance of a multifunctional peripheral when an image forming apparatus according to one embodiment of the present disclosure is applied to the multifunctional peripheral.
Figure 2:
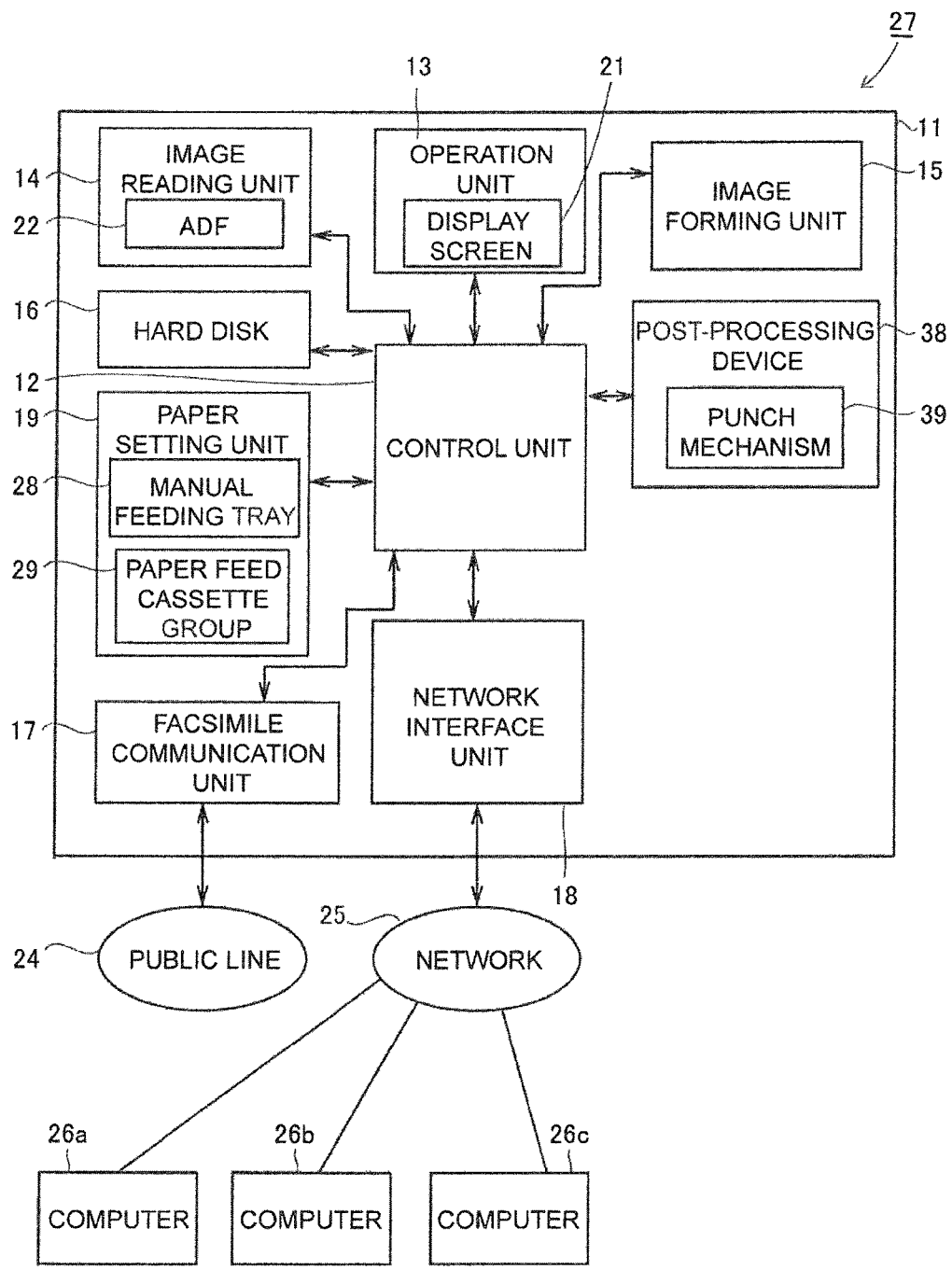
FIG. 2 is a block diagram illustrating the configuration of a multifunctional peripheral when an image forming apparatus according to one embodiment of the present disclosure is applied to the multifunctional peripheral.

Hereinafter, an embodiment of the present disclosure is described. FIG. 1 is a view illustrating the appearance of a multifunctional peripheral when an image forming apparatus according to one embodiment of the present disclosure is applied to the multifunctional peripheral. FIG. 2 is a block diagram illustrating the configuration of a multifunctional peripheral when an image forming apparatus according to one embodiment of the present disclosure is applied to the multifunctional peripheral.

With reference to FIG. 1 to FIG. 2, a multifunctional peripheral 11 as an image forming apparatus according to one embodiment of the present disclosure has a control unit 12, an operation unit 13, an image reading unit 14, an image forming unit 15, a post-processing device 38, a hard disk 16 as a storage unit storing data, a facsimile communication unit 17, and a network interface unit 18 for connection with a network 25.

The control unit 12 controls the entire multifunctional peripheral 11. The operation unit 13 contains a display screen 21 displaying information sent from the multifunctional peripheral 11 side and user input contents. The display screen 21 as a display unit displays data on an image to be formed by the image forming unit 15. The operation unit 13 causes a user to input image formation conditions, such as the number of print copies and gradation, or ON or OFF of a power supply. The image reading unit 14 contains an ADF (Auto Document Feeder) 22 automatically conveying a set document to a reading position. The image reading unit 14 reads an image of a document conveyed by the ADF 22 or a document placed on a placing table (not illustrated). A sheet setting unit 19 contains a manual feeding tray 28 to which a sheet as a recording medium is manually set and a sheet feed cassette group 29 capable of storing a plurality of sheets different in size. The sheet setting unit 19 causes a user to set a sheet to be supplied to the image forming unit 15. The image forming unit 15 forms an image based on a read image or image data transmitted through the network 25. More specifically, the image forming unit 15 forms an image on a recording medium, e.g., a sheet which is set to the sheet setting unit 19, and then conveyed to the image forming unit 15, based on image data in response to a received image formation request. The sheet on which an image is formed by the image forming unit 15 is subjected to post-processing by a post-processing device 38 as necessary, and then discharged to a discharge tray 30. The hard disk 16 stores the transmitted image data, the input image formation conditions, and the like. The facsimile communication unit 17 is connected to a public line 24 and performs facsimile transmission and facsimile reception.

The post-processing device 38 contains a punch mechanism 39 forming a punch hole in a sheet on which an image is formed. To the sheet on which an image is formed in the image forming unit 15, the punch mechanism 39 performs punch processing, i.e., processing of punch hole formation so as to penetrate a part of the sheet on which an image is formed in a front-rear direction of the sheet space. A user requests the punch processing by the punch mechanism 39 as post-processing as necessary. The multifunctional peripheral 11 performs the punch processing by the punch mechanism 39 to the sheet on which an image is formed in response to the request from a user, and then discharges the sheet to the discharge tray 30. The punch processing by the punch mechanism 39 can also be performed to a plurality of sheets in a laminated state at once or can also be performed to each sheet. The hard disk 16 described above stores data of the hole formation positions of the punch holes formed before.

The multifunctional peripheral 11 has a DRAM (Dynamic Random Access Memory) which writes or read-out image data and the like but the illustration and a description thereof is omitted. The arrows in FIG. 2 show the flow of control signals and data on control and images. As illustrated in FIG. 1, in this embodiment, the sheet feed cassette group 29 is configured from three sheet feed cassettes 23a, 23b, and 23c.

The multifunctional peripheral 11 operates as a copying machine by forming an image in the image forming unit 15 using image data of a document read by the image reading unit 14, and then printing the image on a sheet. The multifunctional peripheral 11 operates as a printer by forming an image in the image forming unit 15, and then printing the image on a sheet using image data transmitted from computers 26a, 26b, and 26c connected to the network 25 through the network interface unit 18. More specifically, the image forming unit 15 operates as a printing unit which prints a requested image. The multifunctional peripheral 11 operates as a facsimile device by forming an image in the image forming unit 15 through the DRAM using image data transmitted from the public line 24 through the facsimile communication unit 17 or by transmitting image data of a document read by the image reading unit 14 to the public line 24 through the facsimile communication unit 17. More specifically, the multifunctional peripheral 11 has a plurality of functions, such as a copy function, a printer function, and a facsimile function, about image processing. Furthermore, the multifunctional peripheral 11 has functions which allow detailed settings for each function.

An image formation system 27 containing the multifunctional peripheral 11 has the multifunctional peripheral 11 and a plurality of computers 26a, 26b, and 26c. Specifically, the image formation system 27 has the multifunctional peripheral 11 of the above-described configuration and the plurality of computers 26a, 26b, and 26c connected to the multifunctional peripheral 11 through the network 25. In this embodiment, three computers are illustrated as the plurality of computers 26a to 26c. Each of the computers 26a to 26c can perform printing by performing a print request through the network 25 to the multifunctional peripheral 11.

Figure 3:
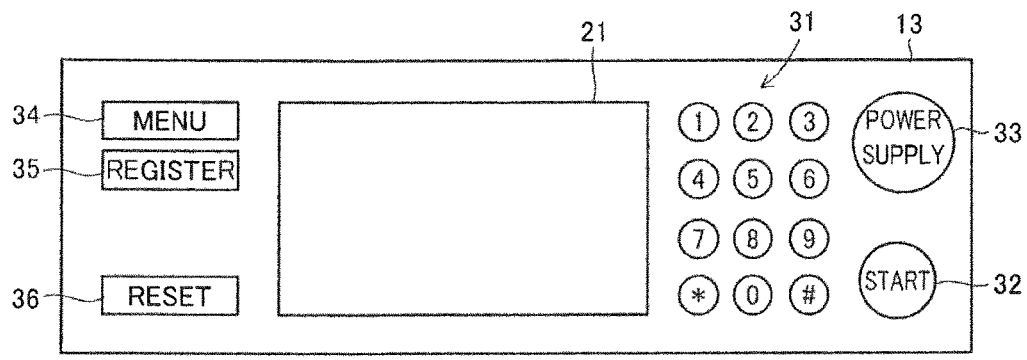
FIG. 3 is an outside view illustrating the configuration of an operation unit.

Next, the configuration of the operation unit 13 described above is described in more detail. FIG. 3 is an outside view illustrating a schematic configuration of the operation unit 13. With reference to FIG. 3, the operation unit 13 contains a ten key 31 for inputting the numbers from 0 to 9 (inputting the number of print copies and the like) and for inputting signs of "*" and "#", a start key 32 for causing a user to direct the start of printing or the start of facsimile transmission, a power supply key 33 for causing a user to input ON or OFF of the power supply of the multifunctional peripheral 11, a menu key 44 for causing a user to direct the selection of a printer function, a copy function, and the like of the multifunctional peripheral 11, a registration key 45 for causing a user to direct the registration of various image formation conditions and a user, a reset key 46 for causing a user to cancel the instruction contents input using the ten key 31 and the like by a user, and the display screen 21 described above. The display screen 21 has a liquid crystal touch panel function and allows a user to input image formation conditions and the like also from the display screen 21 and to select functions by pressing with a finger of the user.

Figure 4:
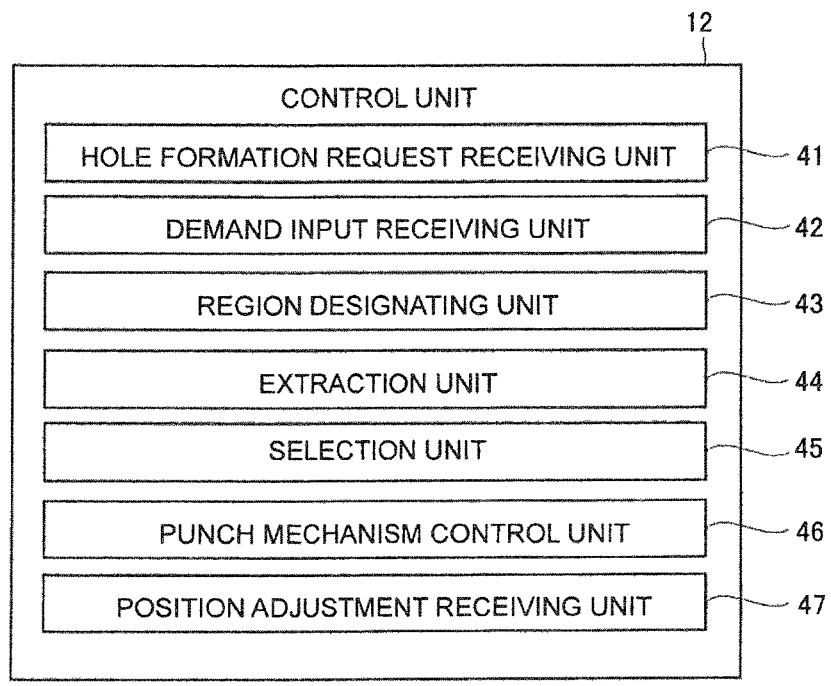
FIG. 4 is a block diagram illustrating the configuration of a control unit contained in a multifunctional peripheral.

Next, the configuration of the control unit 12 is described. FIG. 4 is a block diagram illustrating the configuration of the control unit 12. With reference to FIG. 4, the control unit 12 has a hole formation request receiving unit 41, a demand input receiving unit 42, a region designating unit 43, an extraction unit 44, a selection unit 45, a punch mechanism control unit 46, and a position adjustment receiving unit 47.

The hole formation request receiving unit 41 receives a request of punch hole formation in a sheet by the punch mechanism 39 from a user. The demand input receiving unit 42 receives a demand about punch hole formation from a user. When the hole formation request receiving unit 41 receives a punch hole formation request, the region designating unit 43 causes a user to designate a region where a punch hole is to be formed by the punch mechanism 39 through the display screen 21. The extraction unit 44 extracts punch hole formation portion candidates having a printing rate lower than a predetermined value in the region designated by the region designating unit 43. The selection unit 45 causes a user to select a hole formation portion satisfying the demand input by the demand input receiving unit 42 from the punch hole formation portion candidates extracted by the extraction unit 44. The punch mechanism control unit 46 performs control so as to perform the punch hole formation by the punch mechanism 39 in the hole formation portion selected by the selection unit 45. The position adjustment receiving unit 47 receives adjustment of the hole formation position of each sheet.

Figure 5:
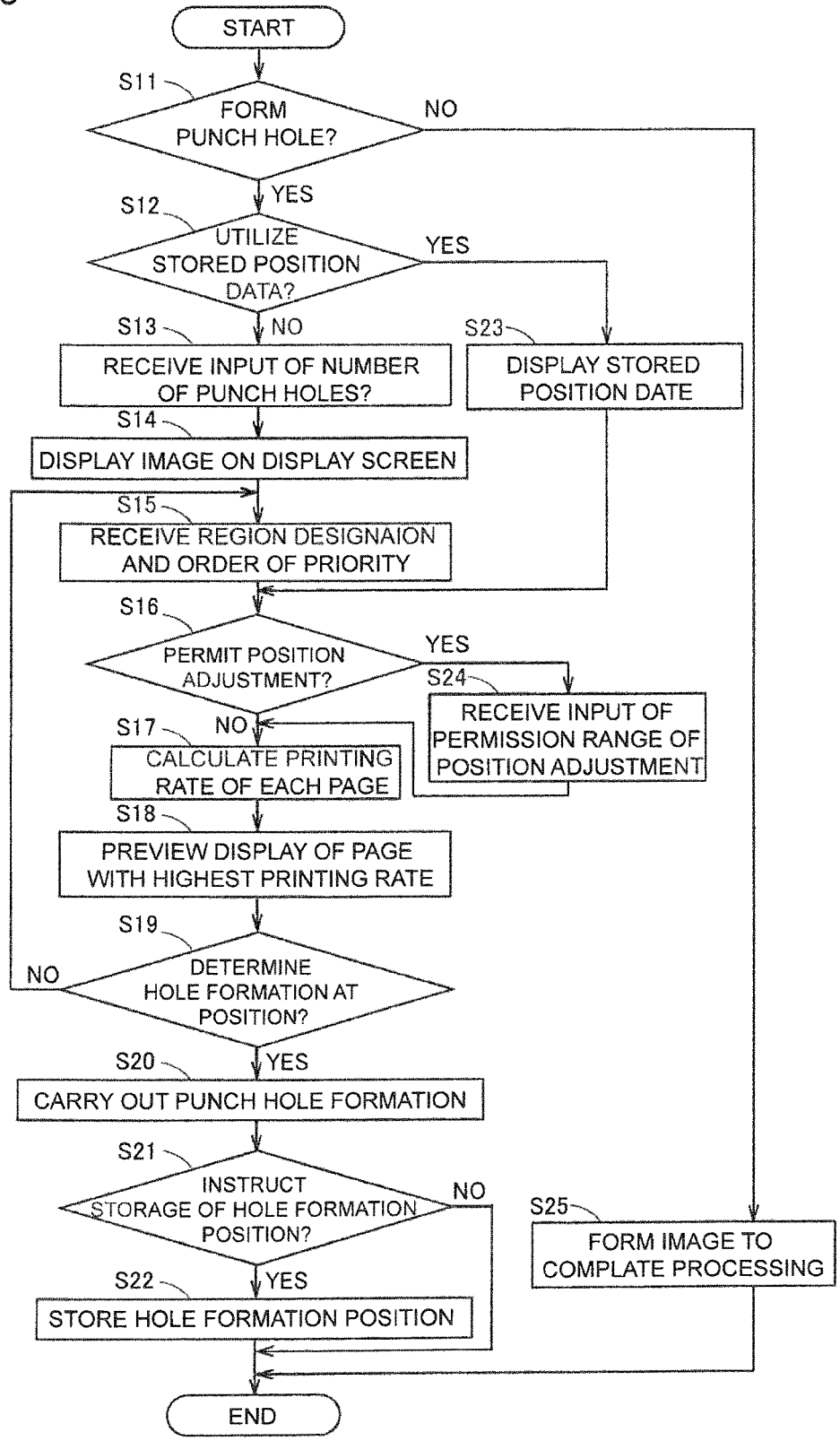
FIG. 5 is a flow chart showing the flow of processing when punch processing is performed using a multifunctional peripheral according to one embodiment of the present disclosure.

Next, a case where punch processing is performed on a sheet on which an image is formed using the multifunctional peripheral 11 is described. FIG. 5 is a flow chart showing the flow of processing when punch processing is performed on a sheet on which an image is formed using the multifunctional peripheral 11 according to one embodiment of the present disclosure. Herein, a case where a plurality of documents are copied is described.

With reference to FIG. 1 to FIG. 5, a user sets a plurality of documents to be copied to the ADF 22. The control unit 12 receives a copy request of the set document through the operation unit 13. Herein, simultaneous with the reception of the copy request, the hole formation request receiving unit 41 receives information on whether or not punch hole formation is requested in the sheet on which an image is formed (Step S11 in FIG. 5, Hereinafter, the "step" is omitted.). Unless the punch hole formation request is received (NO in S11), an image of a document is read by the image reading unit 14, the image is formed on a sheet based on data of the read image, and then the sheet is discharged to the discharge tray 30 to complete the processing (S25).

When the punch hole formation request is received (YES in S11), the demand input receiving unit 42 receives an input of a demand about a punch hole to be formed. Specifically, it is first inquired whether not the stored punch hole position data is utilized (S12). The stored position data is stored in the hard disk 16 and relates to data on positions where punch holes were formed before. In this process, reading of images in the image reading unit 14 is started for the documents set to the ADF 22.

When an input of not-utilizing the position data of the punch holes formed before is performed (NO in S12), the demand input receiving unit 42 next causes a user to input the number of punch holes to be formed. In this case, the number of the punch holes may be input by numerical values or may be input by pressing down any one of a plurality of selection keys.

Figure 6:
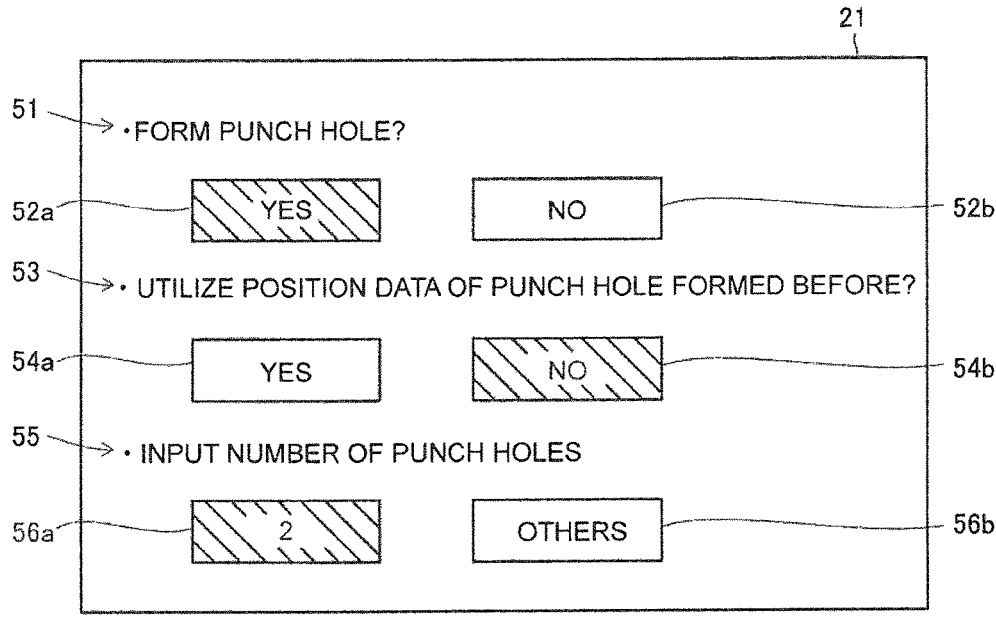
FIG. 6 is a view illustrating an example of a display screen of an operation unit.

FIG. 6 is a view illustrating an example of the display screen 21 of the operation unit 13 when an input is performed by the demand input receiving unit 42 in S11 to S13. With reference to FIG. 6, the display screen 21 displays a message 51 of an inquiry "FORM PUNCH HOLE?", a selection key 52a in which "YES" is indicated and which causes a user to select to form a punch hole by pressing down the key 52a, and a selection key 52b in which "NO" is indicated and which causes a user to select not to form a punch hole by pressing down the key 52b. Moreover, the display screen 21 display a message 53 of an inquiry "UTILIZE POSITION DATA OF PUNCH HOLES FORMED BEFORE?", a selection key 54a in which "YES" is indicated and which causes a user to select to utilize the former position data by pressing down the key 54a, and a selection key 54b in which "NO" is indicated and which causes a user to select not to utilize the former position data by pressing down the key 54b. Moreover, the display screen 21 displays a message 55 "INPUT NUMBER OF PUNCH HOLES", a selection key 56a in which "2" is indicated and which causes a user to input the number of punch holes as 2 by pressing down the key 56a, and a selection key 56b in which "Others" is indicated and which causes a user to shift the screen to a screen on which the number of punch holes is input with the ten key 31 by pressing down the key 56b. In FIG. 6, the state where the selection keys 52a, 54b, and 56a are pressed down is illustrated by hatching. More specifically, requests of forming a punch hole and not utilizing the position data of the punch holes formed before are received.

Next, when the input of the number of punch holes is received (S13), an image causing a user to designate a region where a punch hole is to be formed is displayed on the display screen 21 based on an image read by the image reading unit 14 (S14). Then, the region designating unit 43 receives the designation of the region where a punch hole is to be formed. Herein, the demand input receiving unit 42 receives an input of the order of priority that priority is given to either a printing rate or a position near the center of the designated region for the extraction of a hole formation position (S15). Furthermore, the position adjustment receiving unit 47 receives an input of whether or not position adjustment is permitted (S16).

Figure 7:
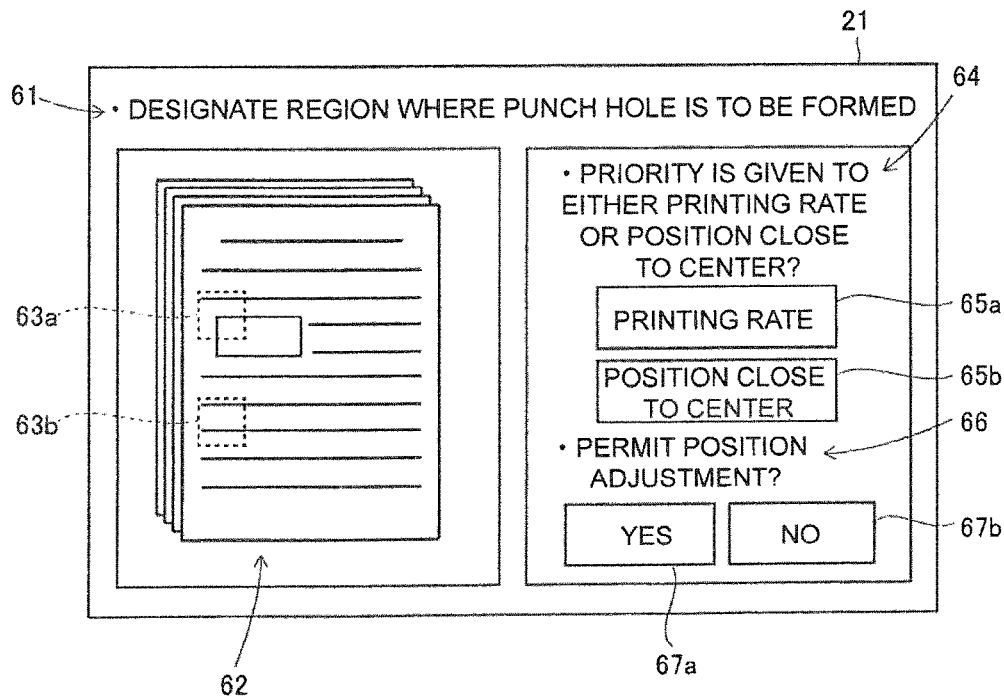
FIG. 7 is a view illustrating an example of a display screen of an operation unit.

FIG. 7 is a view illustrating an example of the display screen 21 of the operation unit 13 in this case. With reference to FIG. 7, the display screen 21 displays a message 61 of an inquiry "DESIGNATE REGION WHERE PUNCH HOLE IS TO BE FORMED", an image 62 of a sheet which is read by the image reading unit 14 and in which a punch hole is to be formed, and a pair of regions 63a and 63b determined by of default. The image 62 is an image of the cover of a document read by the image reading unit 14. The display screen 21 also displays a message 64 of an inquiry "PRIORITY IS GIVEN TO EITHER PRINTING RATE OR POSITION CLOSE TO CENTER?", a selection key 65a in which "PRINTING RATE" is indicated and which causes a user to select a hole formation position having the lowest printing rate among extracted hole formation positions described later by pressing down the key 65a, and a selection key 65b in which "POSITION CLOSE TO CENTER" is indicated and which causes a user to select a hole formation position closest to the center among the extracted hole formation positions by pressing down the key 65b. Moreover, the display screen 21 displays a message 66 of an inquiry "PERMIT POSITION ADJUSTMENT?", a selection key 67a in which "YES" is indicated and which causes a user to select to permit position adjustment by pressing down the key 67a, and a selection key 67b in which "NO" is indicated and which causes a user to select not to permit position adjustment by pressing down the key 67b. Herein, the position adjustment refers to adjust a hole formation position to a position different from the hole formation position determined in the image of the cover of the document, instead of the same position, about images in and after the second sheet, and then determine the adjusted hole formation position. More specifically, the position adjustment of the hole formation position is adjustment of shifting or not shifting the hole formation position for each sheet, when there are a plurality of sheets. In this case, the selection key 67b in which "NO" is indicated is pressed down.

A user sees the display screen 21 illustrated in FIG. 7, and then enlarges, contracts, or moves the position of either the designated region 63a or 63b illustrated by the dotted line. In this case, a user is caused to designate the position, the size, and the range of the designated region 63a by swipe processing or touch processing of a user in the display screen 21 having a touch-panel function. After the designated region 63a is determined, the position, the size, and the range of the other designated region 63b are similarly designated at a position apart from the determined designated region 63a by a distance determined by default. The region designating unit 43 causes a user to designate the region as described above.

With respect to the hole formation position, a user determines to give priority to either the printing rate or the position close to the center, and then presses down either the selection key 65a or 65b. The demand input receiving unit 42 detects the pressing down of either the selection key 65a or 65b. Moreover, a user determines whether or not the position adjustment is permitted, and then presses down either the selection key 67a or 67b. The demand input receiving unit 42 detects the pressing down of either the selection key 67a or 67b.

Thereafter, the extraction unit 44 extracts punch hole formation position candidates with a low printing rate in the region designated by the region designating unit 43. In this case, when the pressing down of the selection key 65a is detected, a hole formation position having the lowest printing rate is extracted. On the other hand, when the pressing down of the selection key 65b is detected, a hole formation position closest to the center is extracted among hole formation positions having a printing rate lower than a predetermined printing rate.

Figure 8:
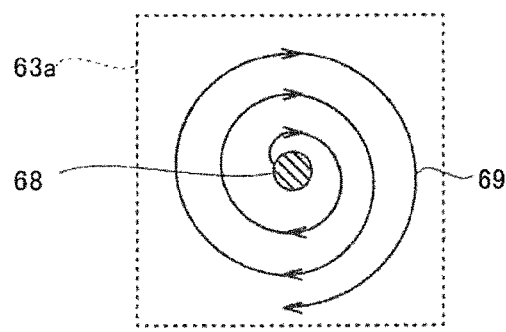
FIG. 8 is a diagram illustrating an example of a method for extracting a hole formation position in an extraction unit.

FIG. 8 is a diagram illustrating an example of a method for extracting the hole formation position in the extraction unit 44. With reference to FIG. 8, the central position is first derived in the designated region 63a. Then, the hole formation position is extracted by investigating the printing rate of a region corresponding to the hole formation position so that the distance from the center is longer clockwise in a spiral shape from the position 68 as indicated by the arrow 69.

Since the input of not permitting the position adjustment of the hole formation position is performed (NO in S16), the printing rate in each sheet is next calculated (S17). Then, a sheet having the highest printing rate is displayed in preview (S18). The highest printing rate means that a printed portion to be removed by the punch hole formation is the largest.

Figure 9:
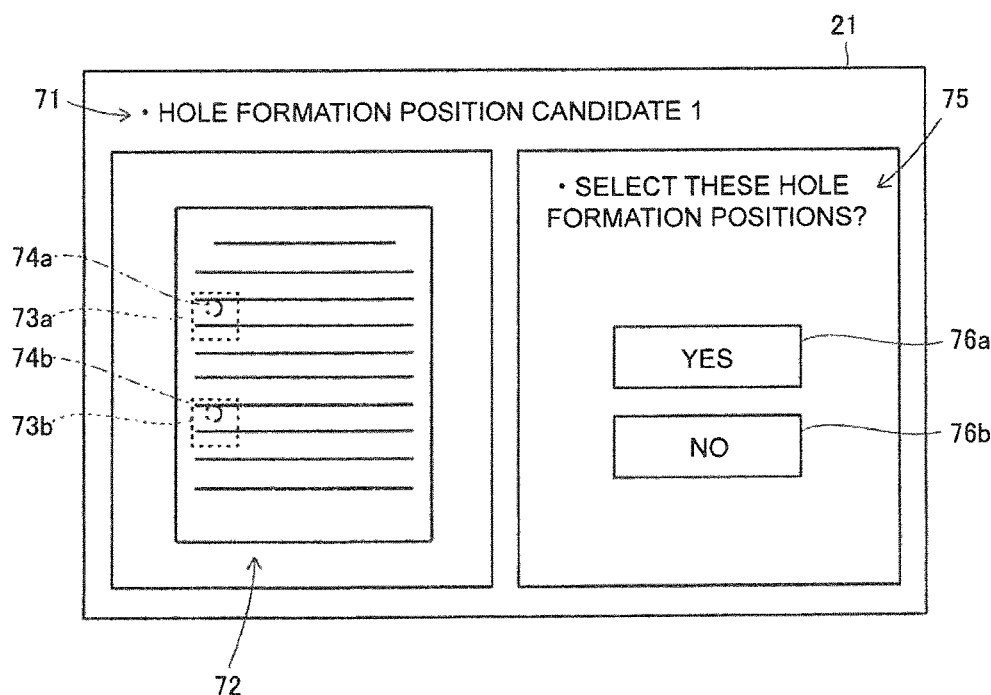
FIG. 9 is a view illustrating an example of a display screen of an operation unit.

FIG. 9 is a view illustrating an example of the display screen 21 of the operation unit 13 in this case. With reference to FIG. 9, the display screen 21 displays and an indication 71 "HOLE FORMATION POSITION CANDIDATE 1", a preview image 72 of a sheet having the highest printing rate, a pair of designated regions 73a and 73b, and temporary hole formation positions 74a and 74b illustrated by the chain double-dashed line. The display screen 21 displays a message 75 of an inquiry "SELECT THESE HOLE FORMATION POSITIONS?", a selection key 76a in which "YES" is indicated and which causes a user to select and determine the hole formation positions by pressing down the key 76a, and a selection key 76b in which "NO" is indicated and which causes a user not to select and determine the hole formation positions by pressing down the key 76b.

A user confirms the preview image 72, and then judges whether or not holes are to be formed at the hole formation positions. When a user determines the formation of holes at the positions, the user presses down the selection key 76a. When the selection unit 45 detects the pressing down of the selection key 76a, the selection unit 45 selects the hole formation positions as positions where punch holes are actually formed (YES in S19). Then, the punch mechanism control unit 46 performs the formation of punch holes at the positions (S20). More specifically, the punch mechanism 39 is operated to a plurality of sheets on which an image is formed, and then punch holes are formed at the determined hole formation positions. When the pressing down of the selection key 76b is detected (NO in S19), other candidates are next displayed as "Hole formation position candidate 2". In this case, a temporary hole formation position having the next lowest printing rate is displayed among the plurality of extracted hole formation positions. Then, other candidates are displayed on the display screen 21 one by one until the pressing down of the selection key 76a is detected.

When the storage of data of the hole formation positions is instructed after the formation of the punch holes (YES in S21), the data of the hole formation positions are stored in the hard disk 16 (S22). Thereafter, the sheets are discharged to the discharge tray 30 to complete the processing. Unless the storage of the data of the hole formation positions is designated after the formation of the punch holes (NO in S21), the sheets are discharged to the discharge tray 30 as they are to complete the processing.

According to the multifunctional peripheral 11 of such a configuration, a punch hole formation position with a low printing rate is extracted in the designated region, and then the punch hole formation is performed by the punch mechanism 39 according to a request of a user. Therefore, the punch hole formation according to a request of a user can be performed.

In this case, the demand input receiving unit 42 receives the input while giving priority to the hole formation portion having the lowest printing rate or the hole formation portion closest to the center of the region designated by the region designating unit 43, and therefore the punch hole formation further satisfying needs of a user can be carried out.

In this case, the punch mechanism control unit 46 performs controls so that one of a pair of punch holes is formed at the punch hole formation position extracted by the extraction unit 44, and then the other punch hole is formed at a position apart from the one punch hole formation position by a predetermined distance, and therefore a reduction in the work of a user can be achieved.

In this case, the hole formation position is extracted by investigating the printing rate of a region corresponding to the hole formation position so that the distance from the center is longer clockwise in a spiral shape from the center of the region designated by the region designating unit 43, and therefore the hole formation position can be more efficiently extracted.

In S12, when the utilization of the position data of the punch holes formed before is input (YES in S12), the position data of the hole formation positions of the punch holes stored in the hard disk 16 are displayed in a list (S23). Then, the demand input receiving unit 42 causes a user to select the position data of any one of the hole formation positions and to input the selection. The subsequent processing is the same as the processing in and after S16. More specifically, the multifunctional peripheral 11 has a configuration of having the hard disk 16 storing the data of the hole formation positions formed by the punch mechanism 39. Then, the demand input receiving unit 42 has a configuration of receiving the input of the demand about the punch hole formation based on the data of the hole formation positions stored in the hard disk 16. Thus, the position data of the hole formation positions of the punch holes stored before are effectively used, so that complexity of a labor of a user can be reduced.

In S16, when the input that the position adjustment of the hole formation position is permitted is received (YES in S16), the input of the permission range of the position adjustment is further received (S24). The subsequent processing is the same as the processing in and after S17. More specifically, the control unit 12 has a configuration of having the position adjustment receiving unit 47 receiving adjustment of the hole formation position for each sheet. Then, the punch mechanism control unit 46 performs controls so that the punch hole formation by the punch mechanism 39 is performed for each sheet based on the adjusted hole formation position received by the position adjustment receiving unit 47. In this case, a user selects and determines the punch hole formation positions for each sheet. Thus, the sheets are slightly shifted when bound in a file. However, for a user who does not care the shift, an output object further satisfying needs of a user can be obtained.

Figure 10:
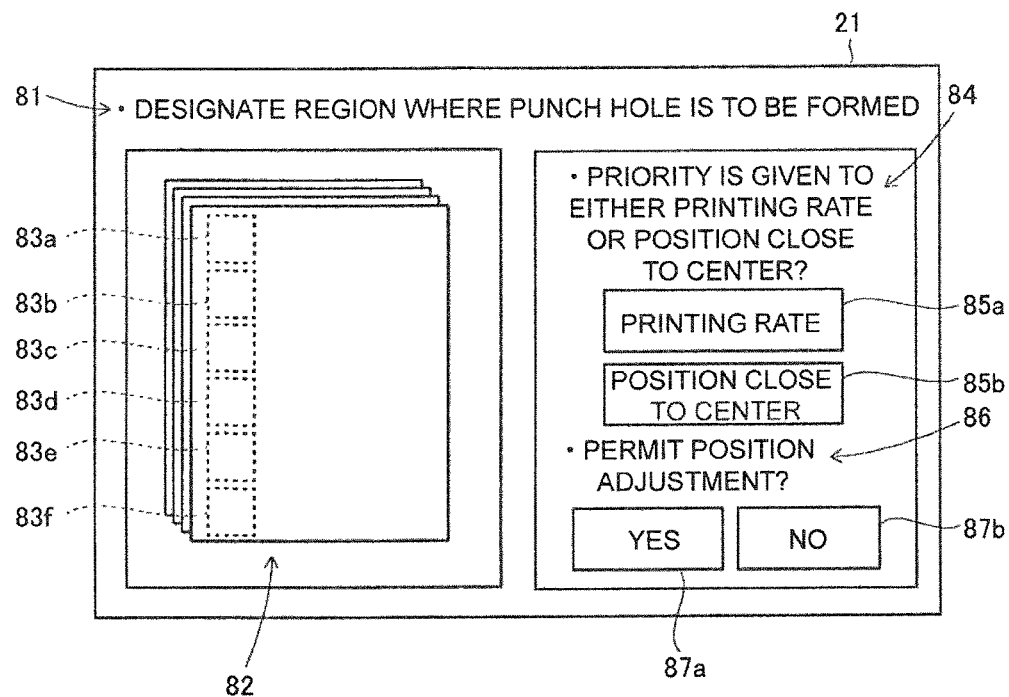
FIG. 10 is a view illustrating an example of a display screen of an operation unit.

A case where the formation of three or more punch holes is requested in the embodiment described above is described. FIG. 10 is a view illustrating an example of the display screen 21 of the operation unit 13 displayed when the number of punch holes of three or more punch holes, herein, six or more punch holes, is input in the display screen 21 illustrated in FIG. 6. FIG. 10 corresponds to FIG. 7.

With reference to FIG. 10, the display screen 21 displays a message 81 of an inquiry "DESIGNATE REGION WHERE PUNCH HOLE IS TO BE FORMED", an image 82 of a sheet which is read by the image reading unit 14 and in which a punch hole is to be formed, and six default designated regions 83a, 83b, 83c, 83d, 83e, and 83f. As is the case with FIG. 7, the display screen 21 displays a message 84 of an inquiry "PRIORITY IS GIVEN TO EITHER PRINTING RATE OR POSITION CLOSE TO CENTER?", a selection key 85a in which "PRINTING RATE" is indicated and which causes a user to select a hole formation position having the lowest printing rate among the extracted hole formation positions by pressing down the key 85a, and a selection key 85b in which "POSITION CLOSE TO CENTER" is indicated and which causes a user to select a hole formation position closest to the center among the extracted hole formation positions by pressing down the key 85b. Moreover, the display screen 21 displays a message 86 of an inquiry "PERMIT POSITION ADJUSTMENT?", a selection key 87a in which "YES" is indicated and which causes a user to select to permit position adjustment by pressing down the key 87a, and a selection key 87b in which "NO" is indicated and which causes a user to select not to permit position adjustment by pressing down the key 87b as is the case with FIG. 7. A user presses down either the selection key 85a or 85b and either the selection key 87a or 87b according to needs. The demand input receiving unit 42 detects pressing down of either the selection key 85a or 85b and either the selection key 87a or 87b.

Thereafter, the extraction unit 44 extracts a candidate of the punch hole formation position with a low printing rate in the designated region by the region designating unit 43. In this case, when the pressing down of the selection key 85a is detected, a hole formation position having the lowest printing rate is extracted. On the other hand, when the pressing down of the selection key 85b is detected, a hole formation position closest to the center is extracted among hole formation positions having a printing rate lower than a predetermined printing rate.

Figure 11:
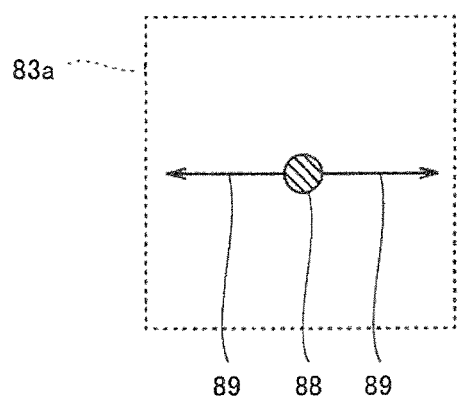
FIG. 11 is a diagram illustrating an example of a method for extracting a hole formation position in an extraction unit.

FIG. 11 is a diagram illustrating an example of a method for extracting the hole formation position in the extraction unit 44. With reference to FIG. 11, a central position 88 is first derived in the designated region 83a. Then, a hole formation position is extracted by investigating the printing rate of a region corresponding to the hole formation position in a right-left direction indicated by the arrow 89 from the position 88. When the number of the punch holes is three or more, a range where the hole formation position can be adjusted is small because punch holes are formed in the vertical direction. Therefore, according to such a configuration, the hole formation position can be more efficiently extracted.

Then, at the determined hole formation positions, the punch mechanism control unit 46 forms one of three or more punch holes at the punch hole formation position extracted by the extraction unit 44, and then forms the remaining punch holes at positions apart from the hole formation position of the one punch hole by a predetermined interval.

Thus, the request of forming three or more punch holes can be satisfied. In this case, the punch mechanism control unit 46 performs controls so that one of three or more punch holes is formed at the punch hole formation position extracted by the extraction unit 44 and the remaining punch holes are formed at the positions apart from the hole formation position of the one punch hole by a predetermined interval, and therefore a reduction in the work of a user can be achieved.

The embodiment described above has the configuration in which, in the case where the formation of two punch holes is requested, when a region of one punch hole is designated, a region of the other punch hole is designated. However, the present disclosure is not limited thereto, and a region of the formation positions of both the punch holes may be designated.

Moreover, the embodiment described above has the configuration in which the hole formation positions are extracted in a direction toward the outside in a spiral shape and in the right-left direction. However, the present disclosure is not limited thereto, and the hole formation positions may be extracted in other directions.

The control unit 12 may be configured so as to have a derivation unit deriving the marks of the punch holes from an image of a document read by an image reading unit 14 and the demand input receiving unit 42 may be configured so as to receive an input of a demand about the punch hole formation based on the marks of the punch holes derived by the derivation unit. Thus, punch hole formation satisfying needs of a user can be more easily performed.

Moreover, the embodiment described above describes the case where copying is performed using the multifunctional peripheral 11. However, the present disclosure is not limited thereto, and is also applied to a case where printing is requested from the computers 26a to 26c through the network 25, for example. More specifically, the present disclosure is applied when the punch mechanism 39 is utilized in the case of performing a printing request to the multifunctional peripheral 11 through the network 25 from the computers 26a to 26c. In this case, an image and the like displayed on the display screen 21 are utilized by being displayed on a display and the like connected to the computers 26a to 26c. Moreover, with respect to the designation of a region, enlargement and movement can be achieved by displaying icons corresponding to the designated region 63a and the like, and then clicking or dropping the frame of the icons.

A configuration may be acceptable in which the position adjustment receiving unit 47 is not provided in the embodiments described above. Thus, a shift of sheets can be suppressed among a plurality of sheets in which punch holes are formed.

The embodiments and examples as disclosed herein should be understood to be illustrative in all respects and not restrictive in any aspect. The scope of the disclosure is specified not by the foregoing description but by Claims, and all alternations that come within the meaning and range of equivalency of Claims are to be embraced within its scope.

The image forming apparatus according to the present disclosure is particularly effectively utilized when punch hole formation satisfying needs of a user is requested.

What is claimed is:

1. An image forming apparatus comprising:
   an image forming unit forming an image on a sheet;
   a punch mechanism forming a punch hole in the sheet on which an image is formed by the image forming unit;
   a display unit displaying data on an image to be formed by the image forming unit;
   a hole formation request receiving unit receiving a request of punch hole formation in the sheet by the punch mechanism from a user;
   a demand input receiving unit receiving an input of a demand about the punch hole formation from the user;
   a region designating unit designating a region in which the punch hole is to be formed by the punch mechanism through the display unit when the hole formation request receiving unit receives the punch hole formation request;

an extraction unit extracting punch hole formation portion candidates having the lowest printing rate in the region designated by the region designating unit;

a selection unit causing a user to select the hole formation portion satisfying the demand input by the demand input receiving unit from the punch hole formation portion candidates extracted by the extraction unit; and a punch mechanism control unit performing control so that the punch hole formation by the punch mechanism is carried out in the hole formation portion selected by the selection unit.

2. The image forming apparatus according to claim 1, comprising:

a position adjustment receiving unit receiving adjustment of a hole formation position for each sheet, wherein the punch mechanism control unit performs control so as to perform the punch hole formation by the punch mechanism for the each sheet based on the adjusted hole formation position received by the position adjustment receiving unit.

3. The image forming apparatus according to claim 1, comprising:

a storage unit storing data of a hole formation position formed by the punch mechanism, wherein the demand input receiving unit receives the input of a demand about the punch hole formation based on the data of the hole formation position stored by the storage unit.

4. The image forming apparatus according to claim 1, wherein the hole formation request receiving unit receives a request of forming a pair of punch holes, and the punch mechanism control unit performs control so that one of the pair of punch holes is formed at the punch hole formation position extracted by the extraction unit, and the other punch hole is formed at a position apart from the formation position of the one punch hole by a predetermined distance.

5. The image forming apparatus according to claim 4, wherein the extraction unit extracts a hole formation position by investigating a printing rate of a region corresponding to a hole formation position from a center of a region designated by the region designating unit so that a distance from the center is longer clockwise in a spiral shape.

6. The image forming apparatus given in claim 1, wherein the hole formation request receiving unit receives a request of forming three or more punch holes, and the punch mechanism control unit performs control so that one of the three or more punch holes is formed at the punch hole formation position extracted by the extraction unit and the remaining punch holes are formed at positions apart from the hole formation position of the one punch hole by a predetermined interval.

7. The image forming apparatus according to claim 6, wherein the extraction unit extracts the punch hole formation position by investigating a printing rate of a region corresponding to the hole formation position toward a right-left direction from a center of a region designated by the region designating unit.

8. The image forming apparatus according to claim 1, comprising:

an image reading unit reading an image of a document; and a derivation unit deriving a mark of a punch hole from the image of the document read by the image reading unit, wherein the demand input receiving unit receives the input of a demand about the punch hole formation based on the mark of the punch hole derived by the derivation unit.

* * * * *